(12) United States Patent
Castille et al.

(10) Patent No.: US 8,645,254 B2
(45) Date of Patent: Feb. 4, 2014

(54) INVESTMENT FUND FOR MAXIMIZING A RISK ADJUSTED EXPECTED RETURN WHILE PROVIDING A DEFINED MINIMUM INCOME AT MATURITY

(75) Inventors: Charles A. Castille, San Francisco, CA (US); Peter L. Hand, Berkeley, CA (US); Trevor T. S. Oliver, Emeryville, CA (US); Kristi Mitchem Mawhinney, Hillsborough, CA (US); Sunder R. Ramkumar, San Francisco, CA (US)

(73) Assignee: BlackRock Institutional Trust Company, National Association, San Francisco, CA (US)

( * ) Notice: Subject to any disclaimer, the term of this patent is extended or adjusted under 35 U.S.C. 154(b) by 472 days.

(21) Appl. No.: 12/248,826

(22) Filed: Oct. 9, 2008

(65) Prior Publication Data

US 2009/0094069 A1    Apr. 9, 2009

Related U.S. Application Data (60) Provisional application No. 60/978,699, filed on Oct. 9, 2007.

(51) Int. Cl.
*G06Q 40/00* (2012.01)
(52) U.S. Cl.
USPC .............................. 705/36 R; 705/4
(58) Field of Classification Search
USPC .................................. 705/35–37, 4
See application file for complete search history.

(56) References Cited

U.S. PATENT DOCUMENTS

| | | | | |
|---|---|---|---|---|
| 6,078,904 A | * | 6/2000 | Rebane | 705/36 R |
| 6,233,566 B1 | * | 5/2001 | Levine et al. | 705/36 R |
| 6,347,307 B1 | * | 2/2002 | Sandhu et al. | 705/36 R |
| 6,393,409 B2 | * | 5/2002 | Young et al. | 705/37 |
| 6,415,267 B1 | * | 7/2002 | Hagan | 705/36 R |
| 6,421,653 B1 | * | 7/2002 | May | 705/36 R |
| 2006/0229964 A1 | | 10/2006 | Fox | |
| 2007/0033121 A1 | * | 2/2007 | Coates | 705/35 |
| 2007/0061238 A1 | | 3/2007 | Merton et al. | |

OTHER PUBLICATIONS

Keith Decker, Katia Sycara and Dajun Zeng; "Designing a Multi-Agent Portfolio Management System". 1995.*
Wtodzimierz Ogryczak, Andrzej Ruszczydski; "From Stochastic Dominance to Mean-Risk Models: Semideviations as Risk Measures". International Institute for Applied Systems Analysis (IIASA), Jun. 1997.*

(Continued)

*Primary Examiner* — Hani M Kazimi
(74) *Attorney, Agent, or Firm* — Fenwick & West LLP (57) ABSTRACT

An investment fund maximizes an investor's risk-adjusted expected return on an investment while also providing the investor with a defined minimum level income upon the maturity of the investment. The investment fund comprises a risk-free portfolio and an upside portfolio. The risk-free portfolio holds risk-free assets that provide a defined minimum income stream upon a predefined maturity date, and the upside portfolio holds sophisticated assets that are only available to qualified investors that meet one or more investing criteria. As new contributions are added to the fund, they are allocated between the risk-free and upside portfolios so that the fund will provide a minimum defined income stream upon its maturity date, where this minimum income amount may increase as more value is added to the fund. Upon maturity, the investor receives the income stream from the risk-free portfolio and the assets from the upside portfolio.

37 Claims, 3 Drawing Sheets

(56) References Cited

OTHER PUBLICATIONS

Vijay Jog, Ignacy Kaliszewski and Wojtek Michalowski; "Using Trade-off Information in Attributes' Investinq"; Apr. 1998.*

PCT International Search Report and Written Opinion, PCT/US08/79394, Dec. 8, 2008, 9 Pages.

* cited by examiner

INVESTMENT FUND FOR MAXIMIZING A RISK ADJUSTED EXPECTED RETURN WHILE PROVIDING A DEFINED MINIMUM INCOME AT MATURITY

CROSS REFERENCE TO RELATED APPLICATIONS

This application claims the benefit of U.S. Provisional Application No. 60/978,699, filed Oct. 9, 2007, which is incorporated by reference in its entirety.

BACKGROUND

This invention relates generally to investment products, and in particular to an investment fund for maximizing a risk-adjusted expected return while providing a defined minimum income at maturity.

Investment options that are currently available to most individuals suffer from a number of drawbacks. For example, individual retirement programs, such as 401 (k) retirement accounts, typically involve a participant contribution to the retirement account and sometimes involve an employer contribution to the retirement account. The participant's contribution is often directed by the participant into a set of funds or other available investment options. The employer's contribution is traditionally invested in the same investment product as the participant's contribution—or worse, in the employer's own stock. These options have significant shortcomings. In particular, individuals usually do not have access to a number of financial services and benefits that are available to more sophisticated investors, so the performance of their retirement accounts is likewise limited. In addition, self-directed investments typically do not contain an optimal mix of assets because most individuals are not sufficiently sophisticated, and because an investor's optimal asset mix typically changes over time. Although there are some existing funds that automatically change their risk profile over time, they do not hold instruments that guarantee a minimum lifetime income to the investors.

Due to the shortfalls of existing investment options available to most investors, it would be desirable to provide an investment fund that can maximize a risk-adjusted expected return while providing a defined minimum income at maturity.

SUMMARY

Embodiments of the invention provide an investment fund that is designed to maximize an investor's risk-adjusted expected return on the investment while also providing the investor with a defined minimum level income upon the maturity of the investment. A number of applications for the investment fund are possible, as described herein.

In one embodiment, an investment fund comprises a risk-free portfolio and an upside portfolio. The risk-free portfolio holds risk-free assets that provide a defined minimum income stream upon a predefined maturity date, and the upside portfolio holds market assets. In one embodiment, the market assets in the upside portfolio include sophisticated assets, which are only available to qualified investors that meet one or more investing criteria. As new contributions are added to the fund, the contributions are allocated between the risk-free and upside portfolios so that the fund will provide a minimum defined income stream upon its maturity date, where this minimum income amount may increase as more value is added to the fund. Upon maturity, the investor receives the income stream from the risk-free portfolio and the assets from the upside portfolio.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Investment Fund Structure

Figure 1:
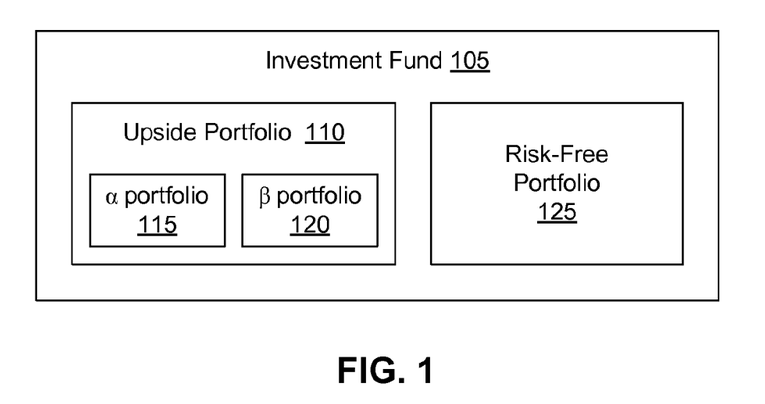
FIG. 1 illustrates an investment fund in accordance with an embodiment of the invention.

FIG. 1 illustrates an investment fund 105 in accordance with an embodiment of the invention. In the example illustrated, the investment fund 105 comprises at least an upside portfolio 110 and a risk-free portfolio 125. The upside portfolio 110 may further be divided into two sub portfolios, an alpha portfolio 115 and a beta portfolio 120. The investment fund 105 may also hold other assets, such as cash, if desirable or necessary. Each of these components of the investment fund 105 is discussed in more detail below.

The upside portfolio 110 is designed to maximize an investor's total expected return per unit of risk for the amount invested in this portfolio 110. In one embodiment, the upside portfolio 110 comprises an alpha portfolio 115 and a beta portfolio 120. The alpha portfolio 115 includes investments that maximize the total alpha or risk-adjusted excess return on the investment. The beta portfolio 120 includes assets that give the investor broad exposure to capital markets. The amount invested in the alpha portfolio 115 and the beta portfolio 120, as a ratio with respect to each other, may be chosen for any desired maximization.

In one embodiment, the upside portfolio 110 includes one or more assets that are only available to certain qualified investors. For example, where the investment fund 105 is offered as a product for a retirement plan, the qualified investor is the plan itself, and the participants in the plan are typically not qualified investors. As used herein, a qualified investor is an individual or entity that meets one or more criteria or qualifications that are required to purchase an asset. In one embodiment, the criteria for defining a qualified investor includes one or more conditions based on an individual's wealth (such as a minimum income or minimum net worth). In another embodiment, the investing criteria may include a condition that requires the qualified investor to be a general partner, executive officer, director, or a related combination thereof, for the issuer of a security being offered. Other embodiments may include conditions that mirror or overlap with legal requirements used to define qualified purchasers and/or accredited investors. Because most individuals are not qualified investors, certain types of sophisticated assets are generally not available to these individuals when directing their own investments. But as a qualified investor, the retirement plan would have the latitude to direct investments into unregistered investment vehicles, such as hedge funds, which are typically not available to individual investors.

In contrast to the upside portfolio 110, the risk-free portfolio 125 provides the investor with a defined minimum income stream (nominal or real) upon a maturity date for the investment fund 105. This portfolio 125 thus provides the risk-free component to the investment fund 105, as a portion of the contributions to the investment fund 105 are converted into guaranteed income for the investor at maturity. As used herein, the term "risk-free" does not necessarily mean that the assets are devoid of all risk; for example, assets that provide for a stream of future payments from an entity are subject to the credit risk that the entity cannot make those payments in the future, and they are subject to mark-to-market risks if the assets are sold before maturity. As used herein, therefore, a "risk-free asset" refers merely to an asset for which the future life-contingent income at a maturity date of the asset is known. Moreover, the term "guaranteed" income is not used to imply that the administrator of the investment fund 105 is providing any legal guarantee or warranty to the investor about the income upon maturity of the fund 105. Rather, the investment fund 105 holds certain risk-free assets in the risk-free portfolio 125 such that the resulting income provided by those assets at a future maturity date will not be less than a known minimum amount. The fund administrator thus defines a particular minimum income for the investors by adding sufficient risk-free assets to the risk-free portfolio 125. Lastly, it is noted that income at maturity is guaranteed only to the extent that the investment fund 105 continues to hold the risk-free assets. Under certain circumstances (e.g., in case of an emergency), a fund manager may decide to sell risk-free assets from the risk-free portfolio 125, thereby reducing the "guaranteed" income at maturity.

To guarantee a particular amount of income upon the maturity date, the risk-free portfolio 125 holds one or more risk-free assets. As used herein, risk-free assets are any assets that provide at maturity a defined income that is not subject to the risk of decreasing (with the exception of default or other credit risk). Various types of risk-free assets may be used to achieve this effect. In one embodiment, the risk-free portfolio 125 comprises annuities as the risk-free assets in the portfolio 125. Various considerations for holding annuities as the risk-free assets in the risk-free portfolio 125 are described in more detail herein.

Inflation-Adjusted Guaranteed Income

The minimum income provided by the risk-free assets may be adjusted for inflation. In one embodiment, the income may be adjusted for inflation only during the accumulation period, or it may be adjusted during both the accumulation and maturity periods. In this way, the risk-free component of the investment fund 105 may gain substantial protection against inflation during the accumulation period. The insulation from inflation may be provided by inflation adjusted annuities, a CPI hedge, or any other financial instruments that provide a minimum inflation adjusted income upon a predefined date.

In one embodiment, therefore, the risk-free portfolio 125 provides a guaranteed inflation adjusted income. The guaranteed inflation adjusted income may be constructed from an annuity in combination with an inflation hedge. The inflation hedge may be constructed of CPI (consumer price index) swaps according the algorithm below:

$$\text{Notional}_{10y} \cdot \text{Duration}_{10y} \cdot \text{Exp}_{10y}^{Shift} + \text{Notional}_{2y} \cdot \text{Duration}_{2y} \cdot \text{Exp}_{2y}^{Shift} = \text{Notional}_{Ann} \cdot \text{Duration}_{Ann} \cdot \text{Exp}_{Ann}^{Shift}$$

$$\text{Notional}_{10y} \cdot \text{Duration}_{10y} \cdot \text{Exp}_{10y}^{Twist} + \text{Notional}_{2y} \cdot \text{Duration}_{2y} \cdot \text{Exp}_{2y}^{Twist} = \text{Notional}_{Ann} \cdot \text{Duration}_{Ann} \cdot \text{Exp}_{Ann}^{Twist}$$

where, $\text{Notional}_{10y}$, $\text{Notional}_{2y}$, and $\text{Notional}_{Ann}$ refer to the notional values of the 10-year swap, 2-year swap, and annuity, respectively; $\text{Duration}_{10y}$, $\text{Duration}_{2y}$, and $\text{Duration}_{Ann}$ refer to the durations of the 10-year swap, 2-year swap, and annuity, respectively; $\text{Exp}_{10y}^{Shift}$, $\text{Exp}_{2y}^{Shift}$, and $\text{Exp}_{Ann}^{Shift}$ refer to the exposure to the shift factor of the 10-year swap, 2-year swap, and annuity, respectively; and $\text{Exp}_{10y}^{Twist}$, $\text{Exp}_{2y}^{Twist}$, and $\text{Exp}_{Ann}^{Twist}$ refer to the exposure to the twist factor of the 10-year swap, 2-year swap, and annuity, respectively. Here, shift and twist refer to the first two principle components of the changes in the inflation curve. Furthermore, the above algorithm assumes that the impact on guaranteed income is:

$$P_t = (1 + I_{real} - I_{imp}) \cdot \left(\frac{C_{t-1}}{P_u}\right),$$

where $I_{real}$ and $I_{imp}$ are the realized and implied inflation, respectively; $C_{t-1}$ is the size of the guaranteed cash flow in the previous period; and $P_u$ is the price of a unit cash flow annuity. This gives the following impact on the level of guaranteed income:

$$C_t = \frac{P_t}{P_u}.$$

Although the example above is discussed using 10-year and 2-year swaps, this can be carried out using any combination of long and short swaps to achieve the same effect.

Accumulation and Maturity Phases

Figure 2:
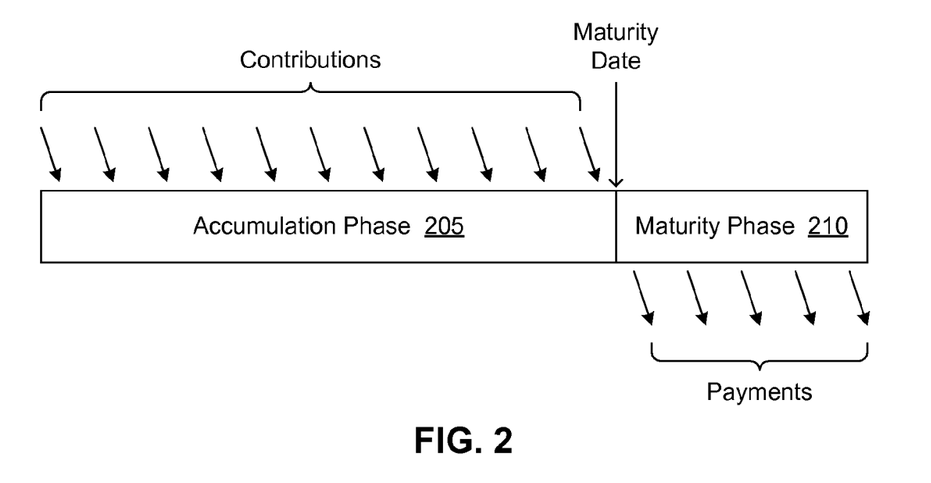
FIG. 2 illustrates a timeline of an investment fund in accordance with an embodiment of the invention.

FIG. 2 illustrates a timeline of an investment fund 105 in accordance with an embodiment of the invention. The timeline includes an accumulation phase 205 and a maturity phase 210. During the accumulation phase 205, a series of contributions are made to the investment fund 105. The series of contributions may be regular or not, and they may be made by the investor or by a third party on behalf of the investor (e.g., as in the case of 401(k) matching funds in an employer sponsored retirement plan). Each contribution is allocated to the upside portfolio 110 and the risk-free portfolio 125, and the component of the contribution to the upside portfolio is further allocated to the alpha portfolio 115 and the beta portfolio 120, to achieve the structure of the fund 105 as described herein. During the accumulation phase 205, capital gains, dividends, and any other gains from the investment may be reinvested into the investment fund 105. These reinvestments may be allocated in the same way as new contributions to the fund 105.

The maturity of the investment fund 105 may be set according to a predefined future maturity date defined for the investment fund 105. For example, for a retirement investment the maturity date may be the year in which the investors in the fund 105 expect to retire (e.g., turn age 65). When the maturity date is reached, the accumulation phase 205 ends and the investment fund 105 reaches the maturity phase 210. At this point, the investor may receive income payments from the assets (e.g., annuities) that were previously held in the investment fund 105. Because the risk-free portfolio 125 component of the investment fund 105 held risk-free assets, the investor will at a minimum receive the guaranteed income payments upon reaching the maturity date. The investor will typically also receive assets from the upside portfolio 110, which amount is not guaranteed due to that portfolio's exposure to market risks.

The structure of the investment fund 105 may also change at the maturity date. In one embodiment, once the maturity date is reached for a particular fund 105, the fund 105 is closed and the investors are paid out for the value of their assets in the investment fund 105. The assets in the risk-free portfolio 125 may be paid to the investors in-kind. For example, where annuities are the risk-free assets in the risk-free portfolio 125, the investors would receive an in kind exchange of the annuities. This in-kind transfer between the investment fund 105 and the investors may advantageously avoid costs associated with canceling and/or setting up income producing assets, such as annuities. The assets in the upside portfolio 110 may be transferred to each investor as a direct investment into one or more assets held by that portfolio 110. The investors may then reinvest, draw down, or otherwise use those assets in any way they choose. Alternatively, the assets in the upside portfolio 110 may be transferred to another fund and the investor given shares in that other fund.

During the accumulation phase 205, for a particular fund 105, the fund administrator may acquire annuities from various insurance providers, depending on the availability and pricing of the annuities from each provider. As a result, the risk-free portfolio 125 for the investment fund 105 may hold annuities from multiple different insurance providers. At the maturity date, if the investors are to receive an in-kind exchange of the annuities, the in-kind transfer might result in financial relationships between an investor and each of the multiple insurance companies. This can be undesirable and inefficient, due to the duplication of paperwork, statements, and the like. To avoid this problem and simplify the investors' situation at maturity, the fund administrator may consolidate the insurance flows from the different sources. The consolidation may be achieved, for example, via netting (i.e., exchanging similar annuities held within a fund or across multiple funds) or using an insurer to consolidate multiple annuities. In another embodiment, consolidation can be achieved by keeping the multiple annuities in place but netting the payments among the insurers. Under this scenario, one insurer (or a fewer number of insurers) would make a payment to the annuitant, where that payment represents the sum total of the payments owed from all of the insurers. This would allow netting of the payments without requiring the annuities themselves to be netted, which may be difficult or costly. The consolidation process will typically occur as the fund 105 approaches maturity to allow a diversified credit risk up to that point. In this way, a single annuity, or at least a reduced number of annuities, can be delivered to each investor at the maturity date.

Because a particular investment fund 105 is associated with a particular maturity date, the fund administrator may offer a family of investment funds for each of a number of different target maturity dates (e.g., a different fund for each relevant year). Each investment fund 105 in the family is then administered as described herein, but for a different maturity date. An investor would then select an investment fund 105 that matches that particular investor's desired maturity date. In one embodiment, the different investment funds in the family each use the same upside portfolio 110 but a different risk-free portfolio 125 that is keyed to the fund's particular maturity date. The risk exposure of each fund 105 may then be controlled for by decreasing the allocation to the upside portfolio 110 (e.g., as the maturity date approaches).

Dynamic Rebalancing

As contributions are made to the investment fund 105 during the accumulation phase 205, the contributions are allocated between the upside portfolio 110 and the risk-free portfolio 125. In addition, gains generated by assets held in the fund 105 may also be allocated between the upside portfolio 110 and the risk-free portfolio 125 when those gains are to be reinvested in the fund 105. In one embodiment, the allocation is made such that:

(1) a sufficient amount of the contribution is invested in the risk-free portfolio 125 to achieve a desired minimum income upon maturity, and (2) the rest of the contribution is allocated to the upside portfolio 110 so that expected total risk-adjusted returns can be maximized subject to the guaranteed income requirement.

This allocation achieves the dual purpose of the investment fund 105—providing a defined minimum income at maturity while maximizing an expected risk-adjusted return of the investor's assets.

The desired allocation between the upside portfolio 110 and the risk-free portfolio 125 may depend on the time remaining to the maturity date of the investment fund 105. Accordingly, as the maturity date approaches, the allocation between the upside portfolio 110 and the risk-free portfolio 125 may change. Moreover, as the upside portfolio 110 component of the investment fund 105 performs in the market over time, it may generate gains that outpace the return to the risk-free asset. Accordingly, the investment fund 105 may periodically and dynamically rebalance the assets between the upside portfolio 110 and the risk-free portfolio 125 to achieve the investment objectives of the fund 105, as described herein. Due to the one-sided nature of the rebalancing caused by market moves, the rebalancing provides a dynamic hedge against the market while maximizing the expected total return on the contributions.

In one embodiment, the guaranteed income stream upon the maturity date is increased over time and/or as the fund 105 receives additional capital. This may occur, for example, when contributions are made to the investment fund 105 and/or when the upside portfolio 110 generates gains. To increase the defined minimum income stream at maturity, more assets are added in the risk-free portfolio 125. Accordingly, when the defined minimum income is to be increased, a new allocation between the upside portfolio 110 and the risk-free portfolio 125 may be made such that a sufficient amount is invested in the risk-free portfolio 125 to achieve the new minimum income upon maturity. This procedure can be used to "lock in" gains made with the upside portfolio 110 by shifting at least a portion of those gains into risk-free assets. The result of locking in the gains with the risk-free assets is to build the amount of the defined income at maturity. This also makes the investment fund 105 less risky over time, as well as when the upside portfolio 110 underperforms.

Glide-Path

In one embodiment, the investment fund 105 follows a "glide-path" to increase the allocation to the risk-free portfolio 125 (and thus increases the defined minimum income at maturity) over time as the maturity date approaches. The investment fund 105 may reduce its risk exposure by decreasing the allocation to the upside portfolio 110 and increasing the allocation to the risk-free portfolio 125 as the maturity date approaches. This reallocation in favor of the risk-free assets provides for continually increasing levels of guaranteed income over time. Advantageously, the fund administrator may also periodically report to the investors this amount of guaranteed income that has been realized by the investment fund 105, in addition to the fund value for each investor. The reallocation between the decreasing upside portfolio 110 and the increasing risk-free portfolio 125 creates a glide-path, where the investment fund 105 automatically becomes less risky for the investor without any direct action by the investor. In this way, embodiments of the invention provide a fund 105 that reduces risk over time against, e.g., an annuity.

In one embodiment, the glide-path for an investment fund 105 is designed so that the investment fund 105 includes an optimal allocation of risk-free assets in the risk-free portfolio 125 at the maturity date. This optimal allocation of risk-free assets may be computed according to a utility function for an investor (such as a utility function for consumption, wealth, bequest, or any other category of utility function). For example, in any of the cases of utility calculation, it may be assumed that investors feel losses more than gains (e.g., where losses are felt twice as much as gains), so a loss of a certain amount is less acceptable to an investor than a gain of that amount is beneficial to the investor. The utility function leads to an optimal allocation of income generating risk-free assets upon maturity of the fund 105. With this optimal allocation at maturity computed, the glide-path of the allocation for the fund 105 may be determined working backwards from the maturity date. The glide-path may follow a linearly increasing path towards the maturity date, a path that increases at an increasing rate, or any other shape of glide-path as desired for the investment fund 105.

In one embodiment, the fund administrator uses an expected utility maximization to determine the desired allocation of the risk-free assets (e.g., annuities) in the fund 105 over time. For example, a utility function may be constructed to determine a proper level of annuitized income at maturity. In one embodiment, an algorithm based on this utility function comprises maximizing the utility of consumption at retirement, weighting the utility by a mortality table, and then using the number of years until retirement as the basis to determine the level of annuity for each year of the fund's life. In one embodiment, the annuitized income at maturity is selected to be about 50% of the total assets in the fund 105 at maturity.

Annuities as Risk-Free Assets

As mentioned above, various embodiments of the investment fund 105 use annuities as some or all of the risk-free assets held in the risk-free portfolio 125. The annuities thus provide at least a portion of the guaranteed or defined income at the maturity date for the fund 105. In embodiments that use annuities as the risk-free assets, the effective management of transaction costs and the pricing of the annuities may be important concerns for the investment fund 105.

Figure 3:
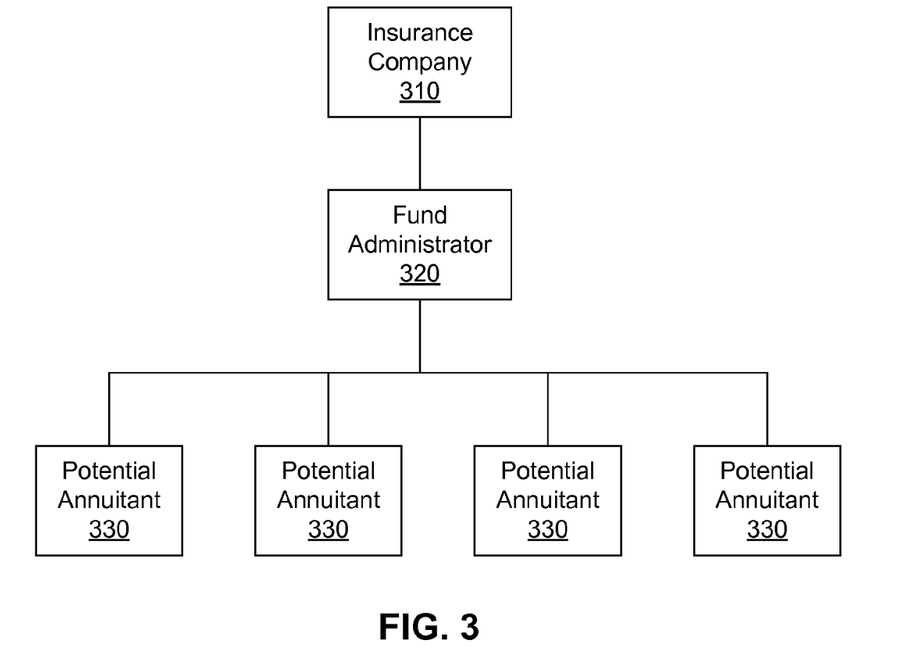
FIG. 3 is a diagram representing an insurer's liability in accordance with an embodiment of the invention.
Figure 4:
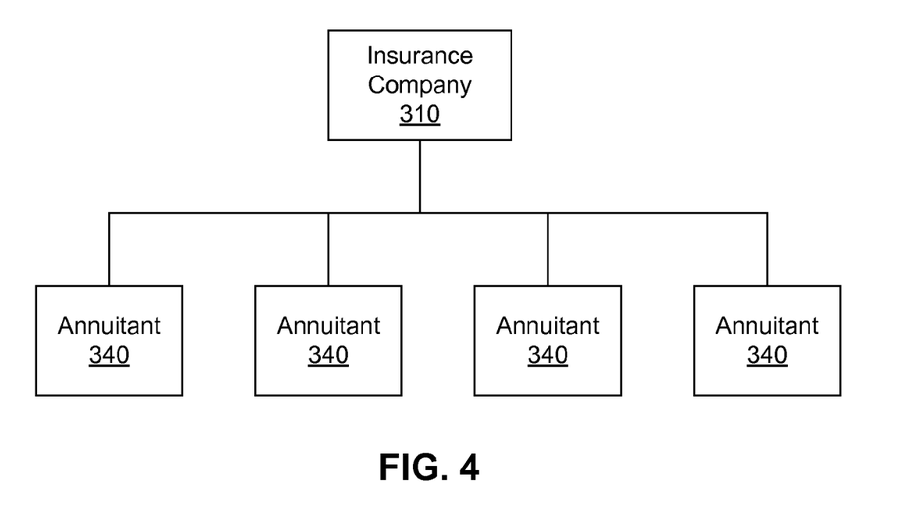
FIG. 4 is diagram representing a relationship between an insurance company and a plurality of annuitants in accordance with an embodiment of the invention.

In one embodiment, the fund administrator 320 is inserted between the investor (or, potential annuitant) 330 and the insurance company 310. This structure tends to make the annuity offerings priced more fairly. In this embodiment, the annuities may be held in the investment fund 105 as group annuities, where the potential annuitant 330 hold a lifetime benefit without providing or having the insurance provider 310 track investor information related specifically to the individual purchaser. In this way, the insurer's liability can be represented generically according to FIG. 3, until the deferral period for the annuities is over and the maturity date of the fund 105 is reached. At the end of the deferral period (i.e., when the annuitant is scheduled to begin receiving payments), the structure reverts to the traditional relationship, in which the insurance company 310 is contracting directly with each annuitant 340, as shown in FIG. 4.

One benefit of not attaching the annuities to the investors until the maturity date is a decreasing of the administrative costs. Holding the annuities as group annuities during the deferral period (the accumulation phase 205 of the fund 105) also allows the fund administrator to evaluate the annuity price independently from the insurance company. The fund administrator can thus determine a fair price for the annuities based on a different set of considerations than those applied by the insurance company.

When the investment fund 105 receives new contributions or when dynamic rebalancing between the fund's portfolios 110 and 125 is required, the fund 105 may need to acquire additional annuities for the risk-free portfolio 125. However, the appropriate annuities may not be available at all or at a price that is deemed acceptable by the fund administrator. If new contributions are placed in the investment fund 105 without purchasing the risk-free assets needed to guarantee the future income, this would have the undesirable effect of decreasing the amount of guaranteed income for all of the investors in the fund 105 due to dilution. To avoid such a scenario, the fund administrator may set up a secondary fund or contingency fund, in which contribution assets are placed while the fund administrator attempts to acquire the desired annuities.

In one embodiment, the secondary fund is designed to be similar to the investment fund 105 (or to an average of the investment funds in the case of a family of funds) so that the contributions placed temporarily in the secondary fund will have similar returns in the market while waiting to be added to the investment fund 105. To achieve this, the secondary fund may hold the same or similar upside portfolio 110 (e.g., with the same alpha portfolio 115 and beta portfolio 120) as the investment fund 105. The secondary fund may further hold risk-free assets that approximate the short term behavior of the risk-free portfolio 125 of the investment fund 105. For example, where the investment fund 105 holds annuities as the risk-free assets, the secondary fund may hold long TIPS rather than an annuity with an inflation hedge. The secondary fund may have a static allocation or may approximate the same glide-path as the investment fund 105.

Another issue that may arise with holding annuities as assets in the investment is the transaction costs associated with annuities, such as the surrender charge. The surrender charge is a type of sales charge that is due if an annuitant sells or withdraws money from a variable annuity during the surrender period (which is a set period of time after the annuity is purchased). Surrender charges and other transaction costs reduce the value of the investment to the investors of the fund 105. To address this issue, in one embodiment, participant flows (e.g., purchases and sales of annuities) across multiple investment funds (i.e., those having different maturity dates) are netted on the basis of the duration of the deferred guaranteed income. In this way, the purchases and sales of the annuities offset each other to at least some degree, creating a zero net effect outside of the fund 105. Because the netting is an accounting activity that is internal to the fund administrator, netting can enable disposing of at least some of the annuities without incurring surrender charges. The netting may be performed for annuities held by a single investment fund 105, or it may be performed for annuities held by multiple funds for which the annuities have a similar duration profile.

The following example illustrates when annuities may be netted to avoid surrender charges. The surrender charges may vary as a function of age; however, the age-dependent surrender charge is only realized on net decreases in annuities over a specified radius of funds (i.e., a group of funds having adjacent maturity dates). For example, if this radius were four and there were a sale of a particular annuity, the surrender charge would be only on the amount of the sale, which could not be netted out against the inflows to the annuities with tenors within four years of the annuity that was sold. If this were the only sale within the radius, then the surrender charge would be given by:

$$S_t \cdot \sum_{n=t-4}^{t+4} \Delta A_n,$$

where $S_t$ is the surrender charge on an annuity with tenor t, and $\Delta A_n$ is the trade (buy or sell) of an annuity with tenor n. If this sum is greater than zero, there would be no surrender charge.

EXAMPLE

Retirement Accounts

To provide a better retirement investment option for participants than existing retirement plans, in one embodiment of the invention, a retirement fund administrator manages an investment fund that includes an upside portfolio 110 and a risk-free portfolio 125, as described above. The fund administrator receives contributions for a participant's retirement account and invests those contributions in the investment fund. In one embodiment, the fund administrator invests only the employer matching contributions for the participants, allowing the participants to direct how their own contributions are invested. However, the fund administrator may also invest the participants' contributions in the investment fund.

In one embodiment, an investment fund as described herein is administered for a defined contribution platform for retirement accounts for a plurality of participants. The participants are included in the investment fund by default, and to invest outside the fund the participants must expressly opt out of the program. This may be beneficial where the risk-free portfolio 125 holds life annuity units as the risk-free assets. The number of people who opt out of automatic features in defined contribution plans is usually very small. Accordingly, the opt out nature of the program should result in a pool of participants with less selection risk, which can be used by the fund administrator to obtain more favorable annuity pricing based on the unbiased pool, as explained below.

The mortality tables upon which annuities may be priced differ from those currently utilized as the basis for annuity pricing in the general market. Current mortality tables account for negative selection bias amongst annuity purchasers, or "annuitants" (i.e., people who purchase an annuity are more likely to live longer). The adjustment to the annuity table is reflected in the formula below:

$$p_A(a) - p_P(a) \equiv \Delta p(a) \geq 0.$$

where $p_A(a)$ is the probability of an annuitant living to an age a and $p_P(a)$ is the probability of the funds participants living to age a. This change in the life expectancy is reflected in the probability weighted discounted cash flows of the annuity price, given by:

$$P_u = e^{-r_t D t_D} \cdot \left[ \sum_{t=t_D+1}^{\infty} p_A(65 - t_D + t) \cdot e^{-r_t t} - \sum_{t=t_D+1}^{\infty} \Delta p(65 - t_D + t) e^{-r_t t} \right],$$

where $r_h$ is the interest rate for a horizon h, $t_D$ is the length of the deferral, and $p(65-t_D+t)$ is the conditional probability of a 65 year old living to the age $65-t_D+t$. Since $\Delta_p(a) \geq 0$, this price will be equal to or less than the prices for the self selected annuitant population. The resulting change in the price is beneficial because it provides the tangible welfare and wealth increase for the annuitant.

Additional Applications for the Investment Fund

In addition to the retirement fund applications for various embodiments of the investment fund described herein, financial institutions may offer other types of investment vehicles that are managed as described herein. For example, a mutual fund or exchange-traded fund (ETF) may be offered, where the fund includes allocations between an upside portfolio 110 of assets and a risk-free portfolio 125 of assets, thereby enabling investors to obtain the benefits of such a fund outside of their retirement accounts. In another embodiment, the investment strategy described herein may be provided in the form of a medium term note program from an entity authorized to issue publicly traded debt (e.g., in the form of an iPath note, available from Barclays Bank PLC). Accordingly, embodiments of the investment vehicle described herein need not be limited to any particular form.

Technical Systems for Managing the Investment Fund

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. These arrangements of operations may be referred to as modules, without loss of generality. The described operations and their associated modules may be embodied in software, firmware, hardware, or any combinations thereof.

Accordingly, any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Figure 5:
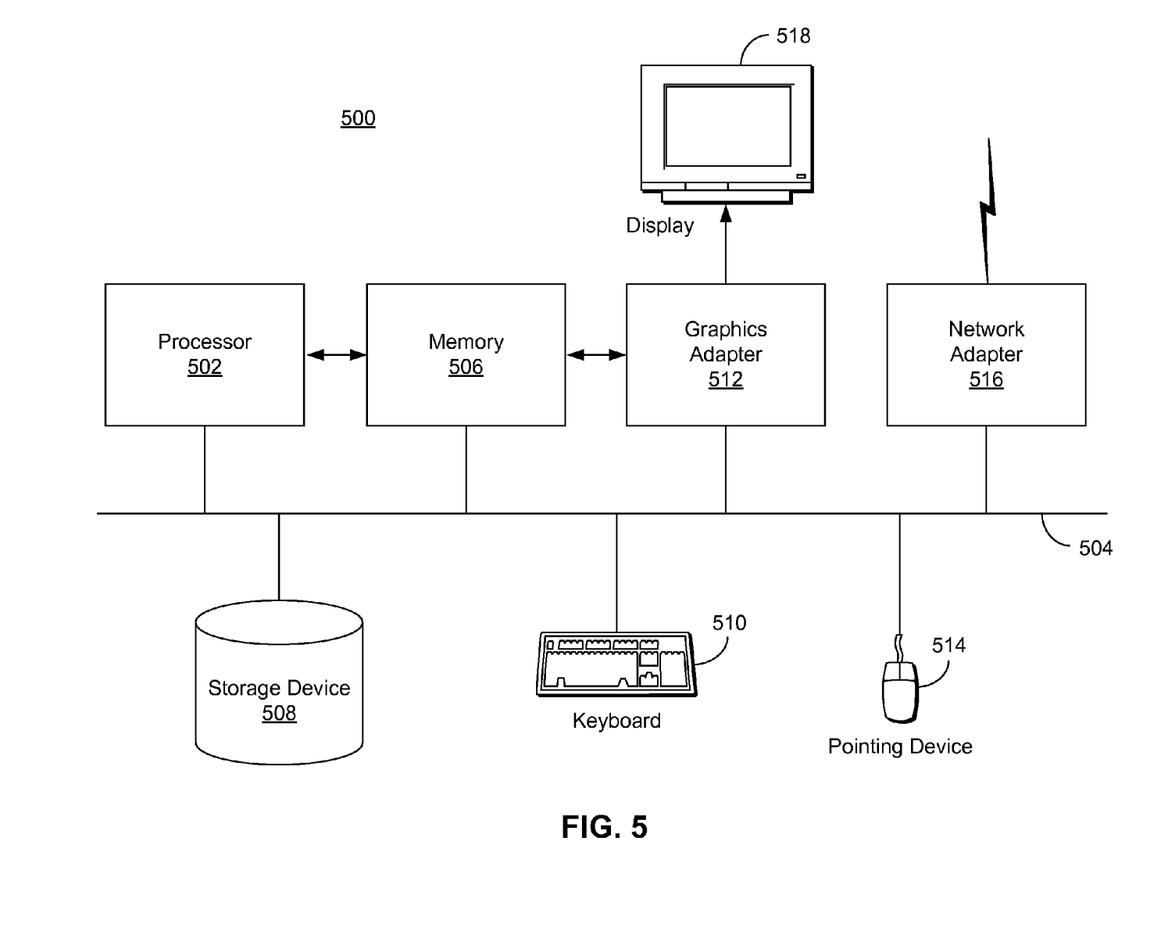
FIG. 5 is a block diagram of a computing system for managing an investment fund in accordance with an embodiment of the invention.

FIG. 5 is a high-level block diagram illustrating a typical computing system 500, which may be used to implement the processing, management, and other functionalities of embodiments of the invention described herein. Illustrated are a processor 502 coupled to a bus 504. Also coupled to the bus 504 are a memory 506, a storage device 508, a keyboard 510, a graphics adapter 512, a pointing device 514, and a network adapter 516. A display 518 is coupled to the graphics adapter 512. The processor 502 may be any general-purpose processor such as an INTEL x86 compatible-CPU. The storage device 508 is, in one embodiment, a hard disk drive but can also be any other device capable of storing data, such as a writeable compact disk (CD) or DVD, or a solid-state memory device. The memory 506 may be, for example, firmware, read-only memory (ROM), non-volatile random access memory (NVRAM), and/or RAM, and holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer 500 to the network. As is known in the art, the computer 500 is adapted to execute computer program modules. As used herein, the term "module" refers to computer program logic and/or data for providing the specified functionality, stored on a computer-readable storage medium and accessible by the processing elements of the computer 500. A module may be implemented in hardware, firmware, and/or software. In one embodiment, the modules are stored on the storage device 508, loaded into the memory 506, and executed by the processor 502.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for administering an investment fund for an investor, the method comprising:
   during an accumulation phase of the investment fund, receiving a series of contributions to the investment fund;
   for each contribution:
      determining an allocation of the contribution between a risk-free portfolio and an upside portfolio using a computing system of an administrator of the investment fund,
      allocating at least a portion of the contribution to the risk-free portfolio, wherein the risk-free portfolio provides a minimum income stream upon a predetermined maturity date for the investment fund, and
      allocating at least a portion of the contribution to the upside portfolio, wherein the upside portfolio comprises one or more sophisticated assets only available to qualified investors that meet one or more investing criteria, and wherein the investor is not a qualified investor; and
   upon the predetermined maturity date for the investment fund:
      assigning the minimum income stream from the risk-free portfolio to the investor, and
      transferring the upside portfolio to the investor.

2. The method of claim 1, wherein the portion of the contribution allocated to the risk-free portfolio is sufficient so that the minimum income stream from the risk-free portfolio achieves a determined minimum income for the investment fund at the maturity date.

3. The method of claim 2, wherein the determined minimum income for the investment fund increases with subsequent contributions.

4. The method of claim 2, wherein the determined minimum income for the investment fund follows a glide-path that increases as the maturity date approaches.

5. The method of claim 4, wherein the glide-path follows an increasing path towards the maturity date to a predetermined allocation of risk-free assets at the maturity of the fund.

6. The method of claim 1, wherein the upside portfolio comprises:
   an alpha portfolio that comprises a set of investments that maximizes a risk-adjusted excess return on investment; and
   a beta portfolio that comprises a set of assets that provides exposure to capital markets.

7. The method of claim 1, wherein the risk-free portfolio comprises annuities.

8. The method of claim 1, wherein the minimum income stream provided by the risk-free portfolio is adjusted for inflation.

9. The method of claim 8, wherein the inflation-adjusted minimum income stream is provided by an annuity in combination with an inflation hedge.

10. The method of claim 1, wherein assigning the minimum income stream from the risk-free portfolio to the investor upon the maturity date comprises an in-kind transfer of one or more annuities to the investor.

11. The method of claim 10, further comprising:
    consolidating annuities from a plurality of different insurance providers to provide the investor with annuities from a fewer number of insurance providers upon the predetermined maturity date for the investment fund.

12. The method of claim 1, wherein the risk-free portfolio holds group annuities during the accumulation phase, and upon the maturity date the annuities revert so that one or more insurance providers associated with the annuities contract directly with the investor.

13. The method of claim 1, wherein transferring the upside portfolio to the investor comprises paying the value of the sophisticated assets in the upside portfolio to the investor.

14. The method of claim 1, wherein any gains from the upside portfolio are reinvested into the investment fund and allocated in the same way as the contributions.

15. The method of claim 1, wherein the investment fund is offered as a product for a retirement plan, the retirement plan meeting the investing criteria for a qualified investor.

16. The method of claim 15, wherein the contributions comprise matching funds provided by an employer of the investor.

17. The method of claim 1, wherein the investment fund is an exchange-traded fund.

18. The method of claim 1, wherein, for at least one contribution, before allocating the contribution to the risk-free and upside portfolios, investing the contribution in a secondary fund that approximates expected returns in a market of the investment fund.

19. A method for administering an investment fund for an investor, the method comprising:
    maintaining risk-free assets in a risk-free portfolio of the investment fund, wherein the risk-free assets provide a minimum income stream upon a predefined maturity date;
    maintaining one or more sophisticated assets in an upside portfolio of the investment fund, wherein the sophisticated assets are only available to qualified investors that meet one or more investing criteria, and wherein the investor is not a qualified investor;

receiving a contribution for the investment fund;

determining a minimum income for the investment fund to provide to the investor at the maturity date using a computing system of an administrator of the investment fund;

adding sufficient risk-free assets to the risk-free portfolio using at least a portion of the contribution, so that the minimum income stream of the risk-free portfolio is at least the determined minimum income for the investment fund; and adding assets to the upside portfolio using at least a portion of the contribution.

20. The method of claim 19, further comprising:

receiving a second contribution for the investment fund;

increasing the determined minimum income for the investment fund based on the second contribution; and adding sufficient risk-free assets to the risk-free portfolio using at least a portion of the second contribution, so that the minimum income stream of the risk-free portfolio is at least the increased determined minimum income for the investment fund.

21. The method of claim 19, wherein the determined minimum income for the investment fund follows a glide-path that increases as the maturity date approaches.

22. The method of claim 21, wherein the glide-path follows an increasing path towards the maturity date to a predetermined allocation of risk-free assets at the maturity of the fund.

23. The method of claim 19, wherein the upside portfolio comprises:

an alpha portfolio that comprises a set of investments that maximizes a risk-adjusted excess return on investment; and a beta portfolio that comprises a set of assets that provides exposure to capital markets.

24. The method of claim 19, wherein the risk-free assets comprise annuities.

25. The method of claim 19, wherein the minimum income stream provided by the risk-free assets is adjusted for inflation.

26. The method of claim 25, wherein the inflation-adjusted minimum income stream is provided by an annuity in combination with an inflation hedge.

27. The method of claim 19, further comprising:

upon the maturity date, assigning the minimum income stream from the risk-free assets to the investor.

28. The method of claim 27, wherein assigning the minimum income stream from the risk-free assets to the investor comprises an in-kind transfer of one or more annuities to the investor.

29. The method of claim 28, further comprising:

consolidating annuities from a plurality of different insurance providers to provide the investor with annuities from a fewer number of insurance providers upon the predefined maturity date for the investment fund.

30. The method of claim 19, wherein the risk-free assets comprise group annuities, and upon the maturity date the annuities revert so that one or more insurance providers associated with the annuities contract directly with the investor.

31. The method of claim 19, further comprising:

upon the maturity date, transferring the upside portfolio to the investor.

32. The method of claim 31, wherein transferring the upside portfolio to the investor comprises paying the value of the sophisticated assets in the upside portfolio to the investor.

33. The method of claim 19, further comprising:

reinvesting gains from the upside portfolio into the investment fund.

34. The method of claim 19, wherein the investment fund is offered as a product for a retirement plan, the retirement plan meeting the investing criteria for a qualified investor.

35. The method of claim 34, wherein the contribution comprises matching funds provided by an employer of the investor.

36. The method of claim 19, wherein the investment fund is an exchange-traded fund.

37. The method of claim 19, wherein, before the adding steps, investing the contribution in a secondary fund that approximates expected returns in a market of the investment fund.

* * * * *